United States Patent
Myers et al.

(10) Patent No.: US 7,891,192 B2
(45) Date of Patent: Feb. 22, 2011

(54) GAS TURBINE ENGINE COMBUSTOR ASSEMBLY HAVING INTEGRATED CONTROL VALVES

(75) Inventors: Geoffrey David Myers, Simpsonville, SC (US); Lewis Berkley Davis, Jr., Niskakyuna, NY (US); Joseph Citeno, Greenville, SC (US)

(73) Assignee: General Electric Company, Schenectady, NY (US)

( * ) Notice: Subject to any disclaimer, the term of this patent is extended or adjusted under 35 U.S.C. 154(b) by 783 days.

(21) Appl. No.: 11/892,859

(22) Filed: Aug. 28, 2007

(65) Prior Publication Data

US 2009/0056335 A1 Mar. 5, 2009

(51) Int. Cl.
*F02C 1/00* (2006.01)
(52) U.S. Cl. ...................................................... 60/741
(58) Field of Classification Search ............... 60/39.281, 60/734, 737, 243, 741; 431/12, 18, 62, 63, 431/264, 354; 126/39 N
See application file for complete search history.

(56) References Cited

U.S. PATENT DOCUMENTS

| | | | | |
|---|---|---|---|---|
| 5,319,931 A | * | 6/1994 | Beebe et al. | 60/773 |
| 5,399,085 A | * | 3/1995 | Taylor | 431/353 |
| 6,438,936 B1 | * | 8/2002 | Ryan | 60/39.511 |
| 6,438,963 B1 | * | 8/2002 | Traver et al. | 60/779 |
| 6,722,135 B2 | | 4/2004 | Davis, Jr. et al. | |
| 6,745,558 B2 | * | 6/2004 | Murakami et al. | 60/39.281 |
| 6,775,986 B2 | * | 8/2004 | Ganz et al. | 60/773 |
| 6,810,655 B2 | | 11/2004 | Davis, Jr. et al. | |
| 2002/0127504 A1 | * | 9/2002 | Neville et al. | 431/1 |

* cited by examiner

*Primary Examiner*—Michael Cuff
*Assistant Examiner*—Phutthiwat Wongwian
(74) *Attorney, Agent, or Firm*—Cantor Colburn LLP

(57) ABSTRACT

A combustor assembly for a gas turbine engine includes a combustor endcover having at least one fuel circuit and mounted thereto a plurality of pre-mixers and at least one control valve. The at least one control valve is fluidly connected to the at least one fuel circuit and operatively connected to a controller. The controller selectively operates the at least one control valve to deliver fuel through the at least one fuel circuit to the plurality of pre-mixers in order to achieve an enhanced level of operational flexibility by providing individual combustion chamber control.

11 Claims, 2 Drawing Sheets

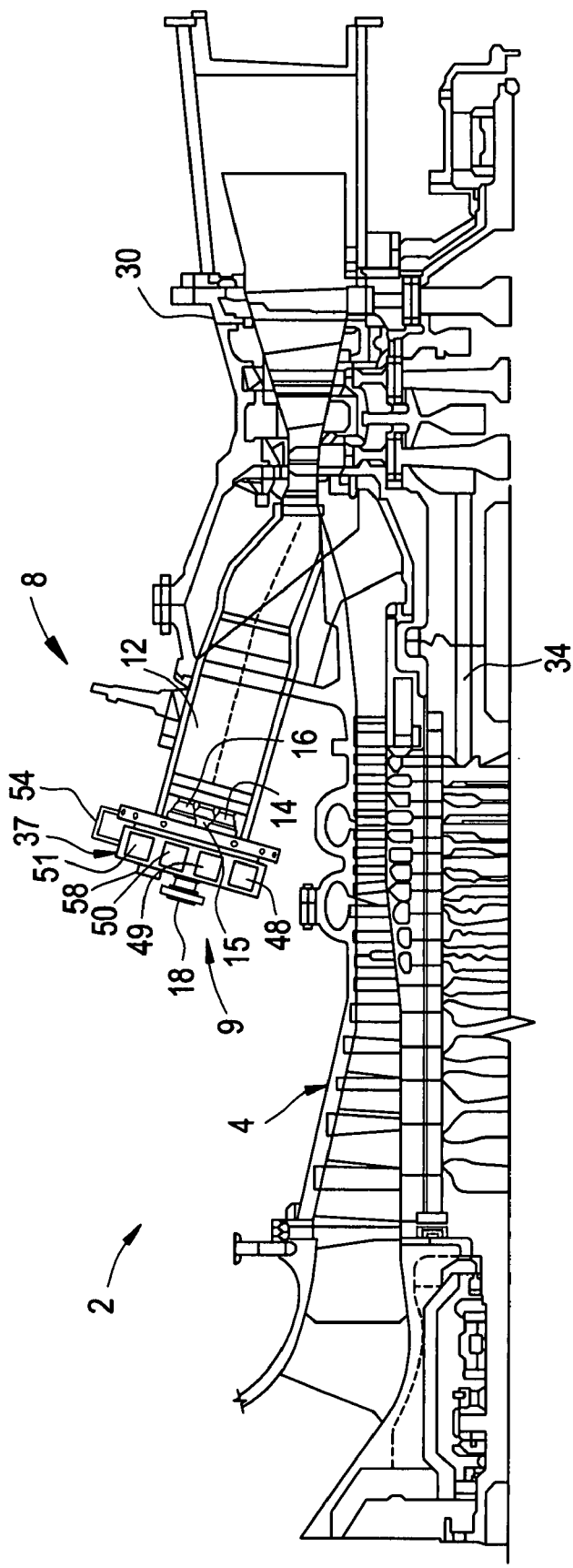

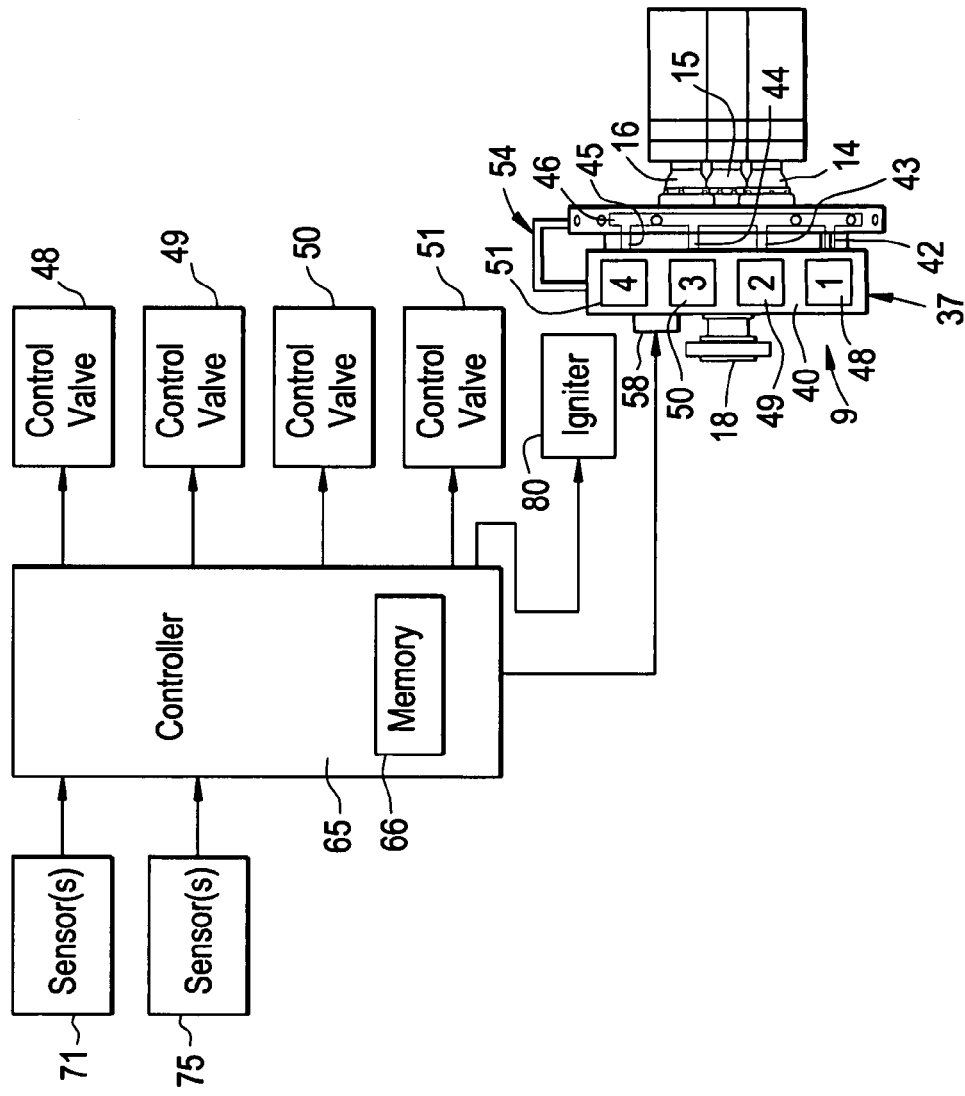

GAS TURBINE ENGINE COMBUSTOR ASSEMBLY HAVING INTEGRATED CONTROL VALVES

BACKGROUND OF THE INVENTION

The present invention pertains to the art of gas turbines and, more particularly, to a gas turbine endcover assembly including a plurality of selectively operable integrated control valves.

In general, gas turbine engines combust a fuel/air mixture in a number of combustion chambers to release heat energy that is channeled to a turbine. A central fuel or gas supply is linked to each of the combustion chambers. The central supply is operated to deliver an amount of fuel through a supply line that is linked to a common manifold which supplies all of the combustion chambers. The fuel is mixed with air and ignited to form the high temperature gas stream. The turbine converts thermal energy from the high temperature gas stream to mechanical energy that rotates a turbine shaft. The output of the turbine may be used in a variety of applications such as, for example, powering an electrical generator.

Several byproducts of combustion, such as nitrous oxide (NOx) carbon monoxide (CO), and unburned hydrocarbons (UHC) are subject to federal and state regulatory limitations. NOx is produced by the oxidation of nitrogen brought in with atmospheric air and is exponentially depending on flame temperature above 2500° F. (1371° C.). In order to maintain NOx emissions within emission compliance, flame temperatures must be maintained below 3000° F. (1649° C.). One method employed to control NOx emission is the injection of inerts, e.g., steam, water, nitrogen into the combustor. The injection of inerts results in a lean mixture and much lower NOx. However, large quantities of very clean steam or water are required, and in some areas, the cost of water/steam can exceed the cost of fuel. The injection of water also has a negative impact on emissions often resulting in an increase in the production of CO and UHCs.

Operation at low bulk fuel/air ratio, near a lean extinction limit, is particularly difficult at reduced load. That is, during off-peak hours operating a generator at full output is not practical. Any energy produced over demand that is not otherwise sold is wasted. Accordingly, balancing low output with lean operation while mainlining emissions compliance is difficult. In order to address this problem the turbine is operated at a piloted-premix in which some 10 to 20% of the fuel is injected directly into the reaction zone and bums as a high temperature diffusion flame. This provides good stability and combustion efficiency, but NOx levels are out-of-compliance. Thus, the turbine is alternately operated in an out of compliance state and in compliances state to maintain average emissions output in compliance.

In addition to the above, restarting a gas turbine combined cycle generator that was shut off is a lengthy process that may take an hour or more before full output is achieved. This lost time can be quite costly for an energy producer. Moreover, a generator that is shut off is not available in the event that additional output is unexpectedly needed during a low demand period. In addition, starting and stopping a generator impacts the durability and life of power system components. Frequent starts and stops will have a detrimental impact on engine reliability and trigger a need for more frequent maintenance cycles thus increasing operational and maintenance costs.

Given the drawbacks, associated with stopping the gas or combined cycle turbine, energy producers prefer to turn down or park the engine during off peak hours to minimize the fuel burned while maintaining the ability to respond to an unplanned increase in load. Parking the turbine engine at a point that allows a quick return to full power, while also remaining emission compliant, is a difficult balancing act for the reasons outlined above. Therefore, when parking a turbine, the engine is operated at a specific part load condition with brief periods of out-of-compliance operation. While effective at maintaining an engine within emission compliance, achievable part load conditions are still high, in the range of 40% of normal output, and thus can represent substantial operational inefficiencies.

In addition to the above, an important over-arching constraint that represents a significant initial barrier and steady, day-to-day struggle in successfully addressing all emissions, reliability and operational flexibility requirements of a turbine engine is the variation inherent in any 'real-world' power plant context. Performance of a lean, premixed combustion system may be impacted by minute changes in external variables. Variation in individual fuel circuit flow (fractions of 1% of the total), night/day and seasonal variations in ambient temperature and relative humidity, site location and elevation, and incremental (a few percent by volume) changes in fuel gas composition, as well as power system load will all impact combustion system performance.

Furthermore, internal variables, such as the chamber-to-chamber variation in air and fuel flow as a result of dimensional differences in system components, and shifts in secondary flows as a result of variations in upstream and downstream turbomachinery also impact combustion system performance. Further, these internal system variables will change with the age and condition of the parts as dictated by the number of hours and cycles and the specific operating 'mission' or path from first-fire to present day. Thus, at present, modem gas engines require multiple fuel circuits for simultaneous control of exhaust emissions and flexible reliable operation over a wide ranges of load, ambient conditions and fuel gas compositions.

BRIEF DESCRIPTION OF THE INVENTION

In accordance with one aspect of the invention, a combustor assembly for a gas turbine engine is provided. The combustor assembly at least one fuel circuit fluidly connected to a plurality of nozzles or pre-mixers. In addition, the combustor assembly includes at least one control valve that is carried by the combustor endcover. The at least one control valve is operatively associated with the at least one fuel circuit and operatively connected to a controller. The controller selectively operates the at least one control valve to deliver fuel the at least one fuel circuit to the plurality of pre-mixers in order to achieve an enhanced level of operational flexibility by providing at least one of individual combustor chamber level and pre-mixer level combustion performance monitoring and control.

In accordance with another aspect of the present invention, a method of selectively operating at least one control valve integrated with a combustor endcover assembly of a gas turbine engine, with the at least one control valve being fluidly connected to at least one fuel circuit is provided. The method includes delivering a supply of fuel to the at least one control valve integrated with the combustor endcover assembly and selectively operating the at least one control valve to pass fuel to the at least one fuel circuit to deliver fuel to a plurality of pre-mixers carried by the combustor endcover.

It should be appreciated that the present invention provides enhanced turbine operational flexibility by enabling individual combustor control and dynamically tailoring combustion inputs as dictated by requirements of a specific combustion chamber operating on local fuel, on a particular gas turbine, at a particular site, at a specific moment in time. In this manner, any impact associated with wear, changes in downstream and upstream components, ambient temperature and fuel/gas composition are compensated for real-time. Thus, the need to anticipate and provide margins for all potential operating ranges on all variables is eliminated. Moreover, the present invention eliminates a large gas volume trapped downstream of the values thereby enabling the turbine to respond much more quickly to any transients in load, or simple chamber-level trimming, to achieve optimum performance. In any event, additional objects, features and advantages of the various aspects of the present invention will become more readily apparent from the following detailed description of illustrated aspects of the invention when taken in conjunction with the drawings wherein like reference numerals refer to corresponding parts in the several views.

BRIEF DESCRIPTION OF THE DRAWINGS

FIG. 1 is a cross sectional side view of an exemplary gas turbine fitted with a combustor endcover assembly including a plurality of selectively operable integrated control valves constructed in accordance with an aspect of the present invention; and FIG. 2 is a schematic view of a combustor endcover assembly of FIG. 1.

DETAILED DESCRIPTION OF THE INVENTION

FIG. 1 is a schematic illustration of an exemplary combined cycle power system illustrated as a gas turbine engine 2. Engine 2 includes a compressor 4 and a plurality of combustor assemblies, one of which is indicated at 8. As each of the plurality of combustor assemblies is identical, a detailed description will be made with respect to combustor assembly 8 with an understanding that the remaining combustor assemblies are identically constructed. As shown, combustor assembly 8 includes an endcover assembly 9 that seals, and at least partially defines, a combustion chamber 12. A plurality of nozzles or pre-mixers 14-16 are supported by endcover assembly 9 and extend into combustion chamber 12. As will be discussed more fully below, pre-mixers 14-16 receive fuel through a common fuel inlet 18 and compressed air from compressor 4. The fuel and compressed air are passed into combustion chamber 12 and ignited to form a high temperature, high pressure combustion product or air stream that is used to drive a turbine 30. Turbine 30 is operationally connected to compressor 4 through a compressor/turbine shaft 34 (sometimes referred to as a rotor).

In operation, air flows into compressor 4 and is compressed into a high pressure gas. The high pressure gas is supplied to combustor assembly 8 and mixed with fuel, for example process gas and/or synthetic gas (syngas) in combustion chamber 12. The fuel/air or combustible mixture ignited to form a high pressure, high temperature combustion gas stream of approximately 871° Celsius (C.) to 1593° C. (1600° Fahrenheit (F.) to 2900° F.). Alternatively, combustor assembly 8 can combust fuels that include, but are not limited to natural gas and/or fuel oil. In any event, combustor assembly 8 channels the combustion gas stream to turbine 30 which coverts thermal energy to mechanical, rotational energy.

In accordance with one aspect of the invention illustrated in FIG. 2, endcover assembly 9 includes a main body portion 37 that defines, at least in part, a fuel plenum 40 and a plurality of fuel delivery circuits 42-45 through which pass fuel to a common manifold 46 that feeds nozzles 14-16. Endcover assembly 9 also includes a plurality of integrated control valves 48-51 which are fluidly connected to corresponding ones of fuel delivery circuits 42-45. In the embodiment shown, control valves 48-51 are three-way valves. In this manner, control valves 48-51 not only control fuel delivery, but also allow purge air to selectively pass through a purge air passage 54 into fuel circuits 42-45. In addition, endcover assembly 9 is shown to include an electrical connector block 58 and a controller 65 having a memory 66. As illustrated, controller 65 is represented as a computer such as that found in a Mark VI (six) Speedtronic GT control system. However, this is merely exemplary of an appropriate high-powered control, which is within the scope of the invention. For example but not limiting of the invention, controller 65 can also be implemented using a suitably programmed general-purpose computer, such as a microprocessor or microcontrol, or other processor device, such as a CPU or MPU, either alone or in conjunction with one or more peripheral data and signal processing devices. In any event, controller 65 is linked to each of control valves 48-51 through electrical connector block 58 as will be discussed more fully below. More specifically, controller 65 selectively operates each of the plurality of control valves 48-51 to meter an amount of fuel delivered from fuel plenum 40 to each fuel delivery circuit 42-45.

In accordance with another aspect of the invention, controller 65 selectively operates control valves 48-51 based upon sensed combustion parameters in combustion chamber 12. More specifically, a number of sensors are located in various portions of engine 2, and arranged to sense various engine operating parameters. For example, engine 2 includes a first plurality of sensors 71 which, in the embodiment shown, are exhaust temperature sensors arranged in a particular array about a hot gas path (HGP) portion (not separately labeled) of engine 2. More specifically, exhaust gas temperature sensors or thermocouples 71 are mounted in a gas turbine exhaust duct in an array of between 18 and 36 depending on the particular turbine. Sensors 71 measure exhaust gas temperatures downstream of an end or last turbine stage. Memory 66 of controller 65 is programmed with baseline exhaust temperature data which is compared, in controller 65, with actual exhaust temperature data collected by sensors 71. Any changes or deviations in the actual exhaust temperatures from the baseline temperature data indicates that one or more of combustor assemblies 8 is operating outside ideal operating parameters and that corrective action is required.

In addition to the plurality of sensors exhaust temperature sensors 71, engine 2 includes a second plurality of sensors 75 which, in accordance with one aspect of the invention, are dynamic pressure sensors provided in each combustion chamber. Pressure sensors 75 dynamically detect pressure in the form of an acoustic signature. In a manner similar to that described above, memory 66 is programmed with an amplitude and frequency data or expected acoustic signatures associated with ideal combustion parameters in each combustion chamber. Pressure sensors 75 sample, real time, actual acoustic signatures in each combustion chamber. The actual acoustic signals are compared to the expected acoustic signals to determine whether any deviation exists. If a deviation from the expected acoustic signal is found, controller 65 selectively operates one or more of valves 48-51, associated with the combustion chamber in which a deviation was detected, to take corrective action. Continuous real time sampling of exhaust temperatures and/or combustion acoustics establishes a closed loop feedback system that is employed by controller 65 to operate engine 2 to gain a refined level of control and generate operational efficiencies heretofore unobtainable as will be discussed more fully below.

Under ideal operating conditions, the output from each combustor assembly 8 is uniform. In this manner, turbine 30 is exposed to a uniform stream of combustion products or gases. Deviations in various parameters of the gas stream can cause operating inefficiencies in engine 2. That being said, ideal operating parameters are seldom achievable. Changes in fuel type, ambient air conditions, age of the engine and minute differences in each combustion chamber contribute to a non-uniform gas stream being directed to turbine 30. By detecting and understanding the differences in combustion parameters in each combustion chamber through the use of a closed loop feedback from sensors 71 and 75, controller 65 can selectively operate each of control valves 48-51 in a particular combustor assembly or assemblies in order to make real-time adjustments to combustion parameters. By providing real time, individual control for each control valve 48-51, controller 65 tailors combustion parameters in each combustion chamber to be as close to ideal as possible.

Not only does the present invention provide real-time control of valves 48-51 to account for differences in input parameters, fuel, air, elevation, etc., to engine 2, but also provides a level of control that enables very low turn down operation. That is, during a turn down, controller 65 selectively operates control valves 48-51 in each combustor assembly to ensure that firing temperatures remain emission compliant while at the same time reducing fuel consumption. Controller 65 will turn down or even off one or more of valves 48-51 in one or more of the plurality of combustor assemblies. By providing real time control over valves 46-49, engine 2 can be turned down or parked at 15-25% of full ISO operating output. In this manner, engine 2 can be brought back to full output in a relatively short period of time, e.g. minutes as opposed to an hour or hours required for a full system restart. Thus, energy providers are now able to stay on the grid longer and be ready or first in line to provide full output when demand increases. In addition, in the event of an unexpected demand increase, the quick return to full power provided by the present invention allows energy providers to be in a constant state of readiness to provide power when needed. In addition, the present invention enables engine 2 to better respond to load transients.

For example, a generator can drop 600,000 hp at the speed of light when an associated control breaker opens. In order to avoid over-speed of the rotor, compressor mass flow and combustor fuel flow must be reduced several fold in seconds. There is no time for the gradual changes. In prior arrangements, any fuel that is trapped in piping that extends between external control valves and associated combustors must be burned through before any energy change is realized. By incorporating control valves 48-51 into each endcover assembly 9, the trapped volume of fuel is greatly reduced thus substantially enhancing system responsiveness. Partial load rejection, load shedding, and handling grid transients (swings in load due to local or external events) are other examples of such large-scale power transients.

In another example, when wind speed exceed wind turbine limits turbine blades are feathered to prevent damage. When wind speeds rise over a large stretch of coastline, and several hundred wind turbines feather and drop off-line, gas turbines are brought online to make up for any loss in load. In parts of the world where wind energy is a large percentage of total energy generation, grid gradients approaching 4000 MW/h have been experienced. Furthermore, in a self-induced transient, such as a loss-of-flame in a single chamber the present invention permits an individual chamber to be rapidly restarted in a piloted mode, and then transferred back into premix independently of the adjacent chambers as will be discussed more fully below.

In accordance with another aspect of the present invention, combustor assembly 8 is provided with an igniter 80 operatively connected to controller 65. Igniter 80 can be a torch, spark plug, plasma generator or other suitable device and is positioned to ignite a fuel/air mixture in combustion chamber 12. By providing each of the plurality of combustion assemblies with an integral igniter, independent operation of each combustion chamber in engine 2 is possible. That is, in the event of a loss of flame (LOF) incident in a particular combustion chamber, such as combustion chamber 12, controller 65 activates igniter 80 to re-light the flame and restore output without requiring a complete engine shut down. The use of an individual, integrated, igniter eliminates any need for cross fire tubes which would otherwise be required to carry hot combustion products from chambers equipped with ignition systems to adjacent chambers as is commonly practiced in industrial gas turbines with can annular combustion system architecture. The use of integral ignition systems and the closed-loop, chamber-level combustion control facilitated by the present invention allows individual chambers to be restarted and operated on independent fuel schedules in lieu of a full system shut down and restart.

At this point it should be appreciated that the present invention provides for individual chamber-level combustion monitoring and closed-loop control that permits moment-by-moment tailoring of fuel splits in each individual combustion chamber in order to suit the external and internal gas turbine system variables specific to that particular gas turbine, site, and load condition. With the addition of an integral ignition system and the elimination of crossfire tubes, each chamber can be operated independently. Independent chamber operation provides distinct benefits by allowing very low load turndown with the engine remaining emission compliant. Combustor exit temperature and operating mode can be varied independently in each chamber, allowing the average turbine inlet temperature to be reduced to spinning reserve levels, while some chambers remain at the relatively high exit temperatures required for in-compliance emissions levels. Alternate chambers could be independently operated in more stable piloted-premix mode, or shut off altogether. Reviving and moving dormant chambers up through a fuel schedule to match the operating mode in the fired chambers enables quick reloading of the system.

The controller could also alternate which combustion chambers are operated in reduced temperature mode to evenly distribute the thermal cycles over the entire hot gas path. Furthermore, as discussed above, by mounting the control valves at each combustion chamber, the present invention eliminates a large gas volume that would otherwise exist downstream. By eliminating the large gas volume, the turbine can respond quickly to any transients in load or simple chamber-level trimming. Such major power system transients would include full load rejection, partial load rejection to house load, "islanding" to support local power demand vs. export to the grid, and grid frequency transients, and response to other external shifts in demand. Moreover, memory 66 provided in controller 65 stores a detailed operating history for each chamber allowing maintenance schedules to shift from a periodic schedule basis to an as needed basis.

In summary, the present invention, with monitoring and control of the combustion process at the chamber level, permits optimization of each chamber in response to all sources of variation, including fuel gas composition, ambient temperature, barometric pressure and humidity, dimensional variation due to manufacturing tolerances in upstream and downstream turbomachinery components and structures, as well as combustion system components, local internal turbine geometry changes (internal lubricant or air extraction/coolant injection piping for example that impacts the adjacent chamber air feed but not others), changes in fuel circuit, fuel injector and valve effective areas due to contamination or wear, and changes in internal secondary air flows as a result of age, thermal-mechanical deformation, creep, or wear.

In addition to the above described benefits, the present invention reduces the number of fuel-wetted bolted joint flanged connections due to a single gas supply to each endcover; eliminates upstream compressor discharge air extraction for purge and eliminates the need for purge control valves and double blockibleed valves. Moreover the present invention provides the ability to identify and re-fire individual chambers when a loss-of-flame event is detected, avoid trips due to loss-of-flame events and actually reduces the likelihood of LOF events as a result of individual chamber monitoring and control and, potential firing of integral igniters during mode transfers. Furthermore, the present invention provides the ability to rapidly implement counter-measures if a gas pre-mixer 'flashback' or flame holding event is detected by shutting off fuel to the affected circuit and enable potential chamber-level circuit-to-circuit communication for flexible emissions and operability optimization ('tuning').

The present invention also ensures minimum heat rejection from the fuel manifolds and piping, potential combination of fuel pre-orifice and fuel metering functions, allowing for a wider range of fuel gas compositions to be addressed with a single set of fuel nozzle assembly hardware, fault identification by manipulating individual chamber firing and monitoring impact on exhaust spreads. Finally, the present invention would allow thermal 'wobbulation', i.e., varying fuel supply to adjacent chambers continuously on a sinusoidal basis such that mean firing temperature is reduced as a function of time while no chamber remains at low or high temperature, and providing for a reduced pressure loss in the piping network between a speed ratio valve and the endcovers. With the gas control valves relocated to the combustion chambers, and a majority of the header, ring manifold and flex hose supply network eliminated, the fuel supply pressure 'headroom' above the compressor discharge pressure can be reduced. The present invention also allows for simple ring manifolds to be used, rather than the more complex tapered manifolds required in the current system to balance the static pressure feeding each individual fuel leg.

Although described with reference to illustrated aspects of the present invention, it should be readily understood that various changes and/or modifications can be made to the invention without departing from the spirit thereof. For instance, while shown as being mounted to the combustor endcover, the location of the control valves can vary and includes mounting the control valves in the pre-mixers or other suitable locations. Furthermore, additional sensors such as ambient air sensors, kW meters, UV sensors, optical flame sensors sensing ion current generated by an electric field near the flame, electromagnetic radiation sensors, thermal visible and ultraviolet sensors, static pressure sensors, acoustic emissions measured externally surface temperature sensors and the like could also be employed in connection with the present invention. In general, the invention is only intended to be limited by the scope of the following claims.

The invention claimed is:

1. A combustor assembly for a gas turbine engine comprising:
   a combustor endcover;
   at least one fuel circuit arranged within the combustion endcover;
   a plurality of pre-mixers mounted to the combustor endcover;
   at least one control valve arranged within the combustor endcover, said at least one control valve being operatively associated with the at least one fuel circuit; and
   a controller selectively operating the at least one control valve to pass fuel to the at least one fuel circuit to deliver the fuel to the plurality of pre-mixers, wherein the controller selectively operates the at least one control valve based upon an operating parameter of the gas turbine engine.

2. The combustor assembly according to claim 1, further comprising: at least one sensor linked to the controller and arranged to sense the operating parameter of the gas turbine engine, said controller selectively operating the at least one control valve based upon the operating parameter sensed by the at least one sensor.

3. The combustor assembly according to claim 2, wherein the at least one sensor is a plurality of sensors, said controller selectively controlling the at least one control valve based upon the operating parameter sensed by a particular one of the plurality of sensors.

4. The combustor assembly according to claim 2, wherein the at least one sensor is at least one of an exhaust temperature sensor, a dynamic pressure sensor, an ambient air temperature sensor, a kW meter and a UV sensor or a combination of sensors including at least one of the foregoing.

5. The combustor assembly according to claim 1, wherein the operating parameter is a fuel parameter.

6. The combustor assembly according to claim 1, where the at least one control valve is a three-way valve.

7. The combustor assembly according to claim 6, further comprising: a purge air circuit operatively connected to the controller, said controller selectively activating the at least one control valve to pass purge air into the at least one fuel circuit.

8. The combustor assembly according to claim 1, wherein the combustor endcover includes a single gas inlet port selectively fluidly connected to the at least one fuel circuit.

9. The combustor assembly according to claim 1, further comprising: an igniter positioned adjacent the plurality of nozzles and operatively connected to the controller.

10. The combustor assembly according to claim 1, wherein the at least one fuel circuit is a plurality of fuel circuits.

11. The combustor assembly according to claim 10, wherein the at least one control valve is a plurality of control valves operatively associated with a respective one of the plurality of fuel circuits.

* * * * *